(12) United States Patent
Hijman et al.

(10) Patent No.: US 8,518,167 B2
(45) Date of Patent: Aug. 27, 2013

(54) POLISH PRODUCT FREE OF VOLATILE COMPONENTS

(75) Inventors: Robert Johannes Hijman, Aarlanderveen (NL); Peter Hotchkin, Hilversum (NL); André Leonard Vermeulen, Capelle aan den Ijssel (NL); Shengyu Jin, Delft (NL)

(73) Assignee: S. C. Johnson & Son, Inc., Racine, WI (US)

( * ) Notice: Subject to any disclaimer, the term of this patent is extended or adjusted under 35 U.S.C. 154(b) by 567 days.

(21) Appl. No.: 12/670,785

(22) PCT Filed: Jul. 25, 2008

(86) PCT No.: PCT/NL2008/050514
§ 371 (c)(1),
(2), (4) Date: Sep. 24, 2010

(87) PCT Pub. No.: WO2009/017404
PCT Pub. Date: Feb. 5, 2009

(65) Prior Publication Data
US 2011/0011420 A1    Jan. 20, 2011

(30) Foreign Application Priority Data
Jul. 27, 2007   (EP) .................................... 07113364

(51) Int. Cl.
*C09G 1/08*   (2006.01)
(52) U.S. Cl.
USPC ............................................................ 106/8
(58) Field of Classification Search
USPC .......................................................... 106/8
See application file for complete search history.

(56) References Cited

U.S. PATENT DOCUMENTS

| | | | | |
|---|---|---|---|---|
| 4,439,342 A * | 3/1984 | Albanese | ........................... | 516/6 |
| 4,439,344 A * | 3/1984 | Albanese | ........................ | 516/69 |
| 4,804,413 A | 2/1989 | Lee | | |
| 5,658,484 A * | 8/1997 | Lohmann et al. | ............ | 252/8.57 |
| 5,782,962 A * | 7/1998 | Burke et al. | ........................ | 106/2 |
| 6,506,715 B1 * | 1/2003 | Schultz et al. | ................. | 510/189 |
| 7,229,486 B2 * | 6/2007 | Wiersema et al. | ................. | 106/3 |
| 2006/0078518 A1 | 4/2006 | Elder et al. | | |

FOREIGN PATENT DOCUMENTS

| | | |
|---|---|---|
| CN | 1195686 | 10/1998 |
| EP | 1469051 | 10/2004 |

OTHER PUBLICATIONS

Fina Lubricants: "Lubricants USA: Vapor Pressure of Mineral Oil," Retrieved from http://www.finalube.com/reference_material/Vapor_Pressure_Of_Mineral_Oil.htm, 2002, 1 page.
International Search Report for PCT/NL2008/050514 mailed Oct. 29, 2008.

* cited by examiner

*Primary Examiner* — Gregory Webb

(57) ABSTRACT

Described is a polish product, and particularly to a shoe or leather care product, in the form of a paste. The product is essentially free of volatile components (organic components as well as water). It comprises a wax component in an amount in the range of from 20-60%, a non-aqueous, non-volatile liquid component, wherein non-volatile is defined as not being an organic volatile substance having a vapor pressure of greater than 1 torr (0.13 kPa), in an amount in the range of from 20-60%, and a fatty component, preferably a fatty acid, in an amount of 1 to 40 wt %, preferably 5-15% all percentages being weight percentages based on total shoe care product.

21 Claims, No Drawings

POLISH PRODUCT FREE OF VOLATILE COMPONENTS

CROSS-REFERENCE TO RELATED APPLICATIONS

The present application is a U.S. national stage application claiming the benefit of International Application No. PCT/NL2008/050514, filed on Jul. 25, 2008, which claims the benefit of European Application No. 07113364.9, filed on Jul. 27, 2007, the contents of which are incorporated herein by reference in their entirety.

The invention pertains to a polish product, and particularly to a shoe and leather care product, in the form of a paste. Such products are normally in the form of a paste or cream containing volatile components which assist the "spreadability/lubricity" of the product when applied to the surface to be polished. These volatile components evaporate quite rapidly to give drying on the surface after which the residual chemicals (such as waxes, fats or oils) can be buffed to give a shine. For such a product, leaving the packaging open between uses will allow evaporation of the more volatile components to give hardening and/or crimping of the product.

In U.S. Pat. No. 4,804,413 a shoe polish composition is described which is said to be non-caking and resistant to drying out. To this end petroleum jelly and silicone oil are added. The product described has a lower viscosity than traditional shoe polish mixtures, and therewith it is unsuitable to serve as a paste according to the invention. The invention aims at a paste, which can be used as a tablet, preferably of sufficient consistency to be loaded, as a separate entity, into a polishing apparatus, enabling easy refill of such an apparatus.

It is desired to dispense with the volatile components, i.e. organic substances having a vapour pressure, at 20° C. of greater than 1 torr (0.13 kPa), typically having low viscosity and low surface tension. This desire is based on current environmental and health concerns, and is increasingly supported by legislation. Also, it is desired to provide a polish product, preferably a shoe care product in the form of a re-usable paste tablet, which can be used in mechanical application systems in which the composition is exposed to air between repeated uses. In the case of a classic, volatiles-based composition, this would lead to untimely drying-out and hardening and/or crimping of the product.

Volatile solvents cannot just be replaced by non-volatile solvent. The latter, i.e. liquids having a vapour pressure, at 20° C. of below 1 torr (0.13 kPa), may tend to exhibit creep. This can be a problem, particularly in situations where the active components (such as wax) in a polish composition are dispersed rather than dissolved in the liquid, as the creep behaviour will lead to liquid removal, and will thus leave the active component in an undesirably hard state. This problem is particularly manifested if polysiloxanes are used as non-volatile liquids, as these tend to show a low compatibility with the wax component.

It is desired to use polysiloxanes rather than, e.g., mineral oils, in view of their better effect on gloss.

Another approach to avoid the presence of volatile organic components, is disclosed in EP 1 469 051. Herein a water-based shoe and leather care product is described. Although water is not a volatile organic component as defined above, it does tend to evaporate from the product, and thus is not suitable to solve the aforementioned problem related to hardening and/or crimping of the product if not kept packaged. Also, water-based systems run a risk of phase-separation between the aqueous and other components, which would render the product unsuitable or, at least, unappealing. It would be desired to have a single-phase product.

In order to better address one or more of the foregoing desires, the invention provides a polish product, preferably a shoe or leather care product, which is essentially free of volatile components (organic volatiles as defined above as well as water), and which comprises a wax component in an amount in the range of from 20-60%, preferably 30-45%, a non-aqueous, non-volatile liquid component, wherein non-volatile is defined as not being an organic volatile substance having a vapour pressure of greater than 1 torr (0.13 kPa), in an amount in the range of from 20-60%, preferably 40-55%, and a fatty component, preferably a fatty acid, in an amount of 1 to 40 wt %, preferably 5-15% all percentages being weight percentages based on total shoe or leather care product.

In another aspect, the invention resides in the use of a composition that is essentially free of volatile components (organic volatiles as defined above as well as water), and which comprises a wax component in an amount in the range of from 20-60%, preferably 30-45%, a non-aqueous, non-volatile liquid component, wherein non-volatile is defined as not being an organic volatile substance having a vapour pressure of greater than 1 torr (0.13 kPa), in an amount in the range of from 20-60%, preferably 40-55%, and a fatty component, preferably a fatty acid, in an amount of 1 to 40 wt %, preferably 5-15% all percentages being weight percentages based on the total composition, as a shoe or leather care product.

In yet another aspect, the invention resides in the use of a composition as defined hereinbefore, for the manufacture of a shoe or leather care product.

It is advantageous to have the fatty component, particularly a fatty acid, present as this helps to obtain the desired compatibility of the wax component and the non-volatile liquid component. The fatty component can be a glyceride, an ester, or an alcohol, and preferably is a fatty acid. More preferably the fatty component comprises one or more fatty acids each having less than 16 carbon atoms. By further preference, the one or more fatty acids are selected from those with alkyl groups consisting primarily C12, C14, C16 and/or C18, with dodecanoic acid being the most preferred. Although mixtures of fatty acids can be used, it is preferred to make use of one type of fatty acid.

In the absence of the fatty component, or in addition thereto, other components can be present which serve to enhance the compatibility of was and non-volatile liquid. E.g. Vaseline (petroleum jelly) can be used, preferably in a low percentage (2-20% by weight).

The wax component can be any wax component suitable for use as an active polish ingredient. The component preferably comprises a wax, which is chosen from the group of mineral waxes, paraffins, microcrystalline waxes, plant derived waxes, animal waxes, Fisher Tropsch waxes, polyolefin waxes, synthetic waxes, silicone waxes, and combinations thereof. Most preferably a wax is selected which has a congealing point between 30° and 100° C. E.g. Paraffin Wax 60/62 supplied by Total Solvents.

The composition is essentially water-free. This does not exclude the presence of a small amount of water, below 2% by weight, preferably below 1% by weight, more preferably below 0.5% by weight. Most preferably, water in essence is absent from the composition.

The non-volatile liquid preferably comprises a silicone oil. More preferably it is a polysiloxane selected from the group consisting of polydimethylsiloxanes, alkylpolymethyl siloxane and substituted polydimethyl siloxanes containing, for example, quaternary bonds. Most preferably, the silicon oil is polydimethylsilicone with a viscosity greater than 1000 mPa·s.

The polish product of the present invention can particularly be used to polish shoes or other leather surfaces. More preferably, it is so used in a mechanical apparatus for polishing shoes or leather. However, the compositions described hereinbefore also lend themselves for the polishing of other substrates, not only leather, but also metal and wood, or generally in household surfaces.

The further ingredients of the polish may conventionally be adapted to the need of the substrates treated. E.g. on a shoe a polish must deliver gloss, colouring (except for the neutral variant) and preferably some protection (waterproofing). Conventional additives for protection include waxes, silicones, and fluorinated polymers. The paste desirably is sufficient hard for the body to remain in place when undergoing forces (particularly when impacted by a rotating brush which at the same time removes some of the paste to the hairs of the rotating brush and subsequently from the brush to the shoe). Yet, it desirably is sufficiently soft or spreadable to allow controlled release to such a rotating brush in an acceptable period of time and with reasonable applied pressure from the user.

The invention will be further explained with reference to the non-limiting Example, which follows.

EXAMPLE

A polish product is made with the composition outlined in Table 1

TABLE 1

| Ingredient | Wt. % | Supplier | Type of ingredient |
| --- | --- | --- | --- |
| W23 | 26.4 | Wacker | Silicone wax - melting point 40° |
| DC2 5088 | 3.6 | Dow-.Corning | Silicone wax - melting point 70° C. |
| Tegopren 6924 | 2 | Goldschmidt | Diquaternary polydimeethylsiloxane |
| DC200 5000 cst | 38 | Dow-Corning | Medium viscosity polydimethylsiloxane |
| DC200 100,000 cst | 6 | Dow-Corning | High viscosity polydimethyl siloxane |
| Gemsperse EP7 | 4 | Gemini Dispersions | Aqueous dispersion of carbon black pigment |
| Vaseline Snow white | 5 | — | Petrolatum |
| Microflex MU | 5 | Baker Petrolite | Parafffin wax |
| Lorol C12 | 10 | Cognis | Lauryl (C12) alcohol |

Method of Mixing

Step 1: Liquid phase: to the mixer add all 4 liquid components, silicone 5000 cs, silicone 100,000 cs, Tegopren and Gemsperse. Stir gently and bring to 90° C.
Step 2: Wax phase: to the mixer add both silicone waxes W23 and DC2088, Microflex Wax., Lorol and Vaseline. Warm and after the Vaseline has melted, stir to mix. Bring the temperature to 90° C.
Step 3: Slowly and with good stirring, add the liquid phase from step 1 into the wax phase. Hold the temperature at 90° C.
Step 4: Pour at 90° C. into the mould (the mould is formed by placing a rectangular frame over the middle portion of the paste holder chip.)
Step 5: Allow to cool for at least 5 minutes before carefully removing the rectangular frame.

The invention claimed is:

1. A polish product comprising:
   a wax in an amount from 20-60 wt. %;
   a non-volatile, non-aqueous, liquid in an amount from 20-60 wt. %; and
   a fatty acid, in an amount of from 1 to 40 wt. %;
   wherein the polish product comprises a water content of less than about 2 wt. % and is essentially free of volatile organic compounds.

2. The polish product according to claim 1, wherein the product is a shoe care product or a leather care product.

3. The polish product according to claim 1, wherein the wax is present in an amount from 30 to 45 wt. %.

4. The polish product according to claim 1, wherein the non-volatile, non-aqueous liquid is present in an amount from 40-55 wt. %.

5. The polish product according to claim 1, wherein the fatty acid is present in an amount from 5-15 wt. %.

6. The polish product according to claim 1, wherein the wax is selected from the group consisting of mineral waxes, paraffins, microcrystalline waxes, plant derived waxes, animal waxes, Fisher Tropsch waxes, polyolefin waxes, synthetic waxes, silicone waxes, and combinations thereof.

7. The polish product according to claim 6, wherein the wax has a congealing point from 30° to 100° C.

8. The polish product according to claim 1, wherein the liquid comprises silicone oil.

9. The polish product according to claim 8, wherein the silicone oil is selected from the group consisting of polydimethylsiloxanes, alkylpolymethyl siloxane and substituted polydimethyl siloxanes.

10. The polish product according to claim 9, wherein the silicone oil is polydimethylsilicone with a viscosity greater than 1000 mPas.

11. The polish product according to claim 1 wherein the fatty acid comprises one or more fatty acids each having less than 18 carbon atoms.

12. The polish product according to claim 11, wherein the one or more fatty acids are selected from the group consisting of C12, C14, C16 and C18 alkyl fatty acids.

13. The polish product according to claim 12, wherein the fatty acid is dodecanoic acid.

14. The polish product according to claim 11, wherein the fatty acid is one type of fatty acid.

15. The polish product according to claim 1, comprising a water content of less than 1 wt. %.

16. The polish product according to claim 1, wherein the polish product is a paste in the form of a tablet.

17. The polish product of claim 15, wherein the polish product has a water content of less than 0.5 wt. %.

18. A method comprising: cleaning or treating a shoe with the polish product of claim 1.

19. The method of claim 18, wherein the cleaning or treating comprises cleaning or treating using a mechanical apparatus.

20. A non-aqueous polish product comprising:
   a wax in an amount from 20-60 wt. %;
   a non-volatile, non-aqueous, liquid; and
   a fatty acid, in an amount of from 1 to 40 wt. %;
   wherein the polish product is a non-aqueous composition and is essentially free of volatile organic compounds.

21. The non-aqueous polish product wherein the non-volatile, non-aqueous liquid is present in an amount from 20-60 wt. %.

* * * * *